(12) United States Patent
Takahashi

(10) Patent No.: US 7,079,474 B2
(45) Date of Patent: Jul. 18, 2006

(54) OPTICAL PICKUP APPARATUS

(75) Inventor: Shinichi Takahashi, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 672 days.

(21) Appl. No.: 09/768,003

(22) Filed: Jan. 24, 2001

(65) Prior Publication Data

US 2001/0026525 A1 Oct. 4, 2001

(30) Foreign Application Priority Data

Jan. 24, 2000 (JP) .............................. 2000-014354

(51) Int. Cl.
*G11B 7/00* (2006.01)
*G11B 7/13* (2006.01)

(52) U.S. Cl. .................. 369/120; 369/121; 369/44.37; 369/44.41

(58) Field of Classification Search ................ 369/120, 369/121, 112.04, 112.15, 112.21, 44.37, 112.01, 369/44.28, 44.11, 44.41, 109.1, 122, 112.29, 369/44.12, 44.29, 112.05, 44.38, 44.32, 53.18; 365/226, 227; 257/726, 706, 723.82, 98.99; 359/19, 44.12, 44.14, 565, 566, 742

See application file for complete search history.

(56) References Cited

U.S. PATENT DOCUMENTS

| | | | | |
|---|---|---|---|---|
| 5,161,040 A | * | 11/1992 | Yokoyama et al. ............ 359/19 |
| 5,986,998 A | * | 11/1999 | Park ............................ 369/121 |
| 6,072,579 A | * | 6/2000 | Funato ........................ 356/457 |
| 6,091,689 A | * | 7/2000 | Taniguchi et al. ...... 369/112.21 |
| 6,130,872 A | * | 10/2000 | Sugiura et al. ......... 369/112.04 |
| 6,188,132 B1 | * | 2/2001 | Shih et al. ................... 257/724 |
| 6,195,305 B1 | * | 2/2001 | Fujisawa et al. ............ 365/226 |
| 6,240,053 B1 | * | 5/2001 | Akiyama ................. 369/44.23 |
| 6,366,548 B1 | * | 4/2002 | Ohyama ................ 369/112.04 |
| 6,452,880 B1 | * | 9/2002 | Kawamura et al. ....... 369/44.37 |
| 6,496,469 B1 | * | 12/2002 | Uchizaki ..................... 369/122 |
| 6,567,355 B1 | * | 5/2003 | Izumi et al. ............. 369/44.41 |
| 6,597,642 B1 | * | 7/2003 | Ijima et al. .............. 369/44.11 |
| 6,646,975 B1 | * | 11/2003 | Uchizaki et al. ............ 369/121 |

\* cited by examiner

*Primary Examiner*—William Korzuch
*Assistant Examiner*—Kim-Kwok Chu
(74) *Attorney, Agent, or Firm*—Sughrue Mion, PLLC

(57) ABSTRACT

It is an object of the present invention to provide an optical pickup apparatus which is capable of supporting multiple wavelengths in a reduced size without using a combined prism.

An apparatus includes light emitting means having a plurality of integrated light emitting portions for emitting laser beams of different wavelengths, the light emitting means being adapted to selectively emit one of the laser beams of different wavelengths; photodetecting means for detecting the laser beam; and an optical system for directing the laser beam emitted from the light emitting means to the disc, and for directing the laser beam reflected by the disc to the photodetecting means, wherein the light emitting means is positioned such that a straight line connecting respective light emitting points of the plurality of light emitting portions is coincident with a tangential line of a track on a disc to be reproduced.

10 Claims, 15 Drawing Sheets

OPTICAL PICKUP APPARATUS

BACKGROUND OF THE INVENTION

1. Field of the Invention

The present invention relates to an optical pickup apparatus for reading information from a plurality of optical discs to be respectively read in different reading wavelengths, and more particularly, to an optical pickup apparatus which includes a semiconductor light source for emitting a plurality of laser beams of different wavelengths and a photodetector for detecting the plurality of laser beams.

2. Description of the Related Art

There have been various proposals relating a compatible disc player for reproducing a CD (Compact Disc) and a DVD (Digital Versatile Disc) in which an optical pickup is commonly used to reproduce the CD and the DVD. The DVD/CD compatible disc player employs an optical pickup having, for example, a single-wavelength bifocal lens or a bifocal lens.

In comparison of the CD with the DVD in terms of a disc structure, the DVD disc has a protection layer, the thickness of which (for example, 0.6 mm) is approximately one half the thickness of the protection layer of the CD disc. Thus, the following problems arise when both discs are reproduced by a common optical pickup employing a monofocal lens. Aberration such as spherical aberration occurs in the light beam due to the protection layer of the CD disc which is thicker than that of the DVD disc, through which the light beam passes, when a light beam is converged to be optimal for an information recording surface of the DVD disc. Therefore, the light beam cannot be optimally converged for an information recording surface of the CD disc.

In addition, it is necessary to form a beam spot of a size optimized for the size of the information pits on the information recording surface in order to correctly read the respective information pits since the CD disc differs from the DVD disc in the size of information pits formed for recording.

The size of the beam spot is proportional to the ratio of the wavelength of a laser beam to the numerical aperture of an objective lens for converging the laser beam on the information recording surface. With a fixed wavelength of a laser beam, the beam spot is smaller as the numerical aperture is larger. Therefore, the beam spot excessively smaller for information pits, for example, on the CD disc when the CD and the DVD are reproduced by means of a common optical pickup employing a monofocal lens and the numerical aperture is adapted to information pits on the DVD disc with a fixed wavelength of the laser beam. Thus, a reproduced signal suffers distortion when the CD is reproduced, thereby making it difficult to correctly read the information pits on the CD.

To overcome the above-described problem, the DVD/CD compatible reproducing apparatuses mainly adopt an optical pickup employing a bifocal lens which is capable of focusing at different positions on the same straight line and irradiating two laser beams for forming beam spots of sizes appropriate for the sizes of the respective information pits.

For example, an optical pickup apparatus illustrated in FIG. 1 combines light beams from a first light source 10 for a CD and a second light source 15 for a DVD with a first beam splitter 13 which is a combining prism, and has a bifocal lens comprised of an objective lens and a diffraction element. A DVD/CD compatible reproducing apparatus having the optical pickup apparatus will be described below in terms of configuration and operation.

In FIG. 1, a first light source 10 generates a laser beam (indicated by broken lines) of a wavelength (780 nm) optimal for reading information from the CD in response to a driving signal from a first driver circuit 11. The laser beam is irradiated to the first beam splitter 13 through an optical grating 12 for generating three beams. The first beam splitter 13 reflects the laser beam from the first light source 10 to direct the reflected light to a second beam splitter 14.

The second light source 15 positioned at 90 degrees with respect to the first light source 10, on the other hand, generates a laser beam (indicated by solid lines) of a wavelength (650 nm) optimal for reading information from a DVD in response to a driving signal from a second driver circuit 16, and irradiates the laser beam to the first beam splitter 13 through an optical grating 17. The first beam splitter 13 transmits the laser beam from the second light source 15 to direct the same to the second beam splitter 14.

The second beam splitter 14 directs the laser beam supplied through the first beam splitter 13, i.e., the laser beam from the first light source 10 or the second light source 15 to a bifocal lens 19 through a collimator lens 18. The bifocal lens 19 converges the laser beam from the second beam splitter 14 to a single point, and irradiates the converged laser beam, as information reading light, to an information reading surface of a disc 21 which is driven by a spindle motor 20 to rotate.

The laser beam (indicated by broken lines) from the first light source 10 is converged by the bifocal lens 19 so as to focus on an information recording surface C of the disc 21. The laser beam (indicated by solid lines) from the second light source 15 in turn is converged by the bifocal lens 19 so as to focus on an information recording surface D of the disc 21.

Reflected light produced by irradiating the information reading light from the bifocal lens 19 to the disc 21 passes through the bifocal lens 19 and the collimator lens 18, is reflected by the second beam splitter 14, passes through a cylindrical lens 22 serving as an astigmatism generating element, and impinges on a photodetector 23. The photodetector 23 generates an analog electric signal corresponding to the amount of incident light, and supplies the analog electric signal to an information data reproducing circuit 24 and a disc discriminating circuit 25 as a read signal.

The information data reproducing circuit 24 generates a digital signal based on the supplied read signal, and applies demodulation and error correction to the digital signal for reproducing information data. The disc discriminating circuit 25 identifies the type of the disc 21 based on the size of a beam spot which is formed when the disc 21 is irradiated with the laser beam, for example, as disclosed by the same applicant in Laid-open Japanese Patent Application Kokai No. H10-255274, and supplies the identified type to a controller 26. The controller 26 controls in response to a disc identifying signal to selectively drive either the first driver circuit 11 or the second driver circuit 16. The controller 26 only drives the first driver circuit 11 when it is supplied with a disc identifying signal of CD from the disc discriminating circuit 25. Therefore, the laser beam emitted from the first light source 10 is irradiated to the disc 21 through the optical system including the grating 12, the first beam splitter 13, the second beam splitter 14, the collimator lens 18 and the bifocal lens 19.

On the other hand, the controller 26 only drives the second driver circuit 16 when it is supplied with the disc identifying signal of DVD from the disc discriminating circuit 25. Therefore, the laser beam emitted from the second light source 15 is irradiated to the disc 21 through the optical system including the grating 17, the first beam splitter 13, the second beam splitter 14, the collimator lens 18 and the bifocal lens 19.

Stated another way, the optical pickup apparatus is configured to include the first light source 10 for generating a laser beam having a wavelength optimal for reading information from the disc 21 such as a CD which has a relatively low recording density, and the second light source 15 for generating a laser beam having a wavelength optimal for reading information from the disc 21 such as a DVD which has a high recording density, so as to alternatively use the one corresponding to the type of the disc 21 from which information is reproduced. Reflected light (return light) reflected from the information recording surface of the disc 21 passes through the bifocal lens 19 and the collimator lens 18, is reflected by the second beam splitter 14, passes through the cylindrical lens 22, and impinges on the photodetector 23.

As described above, in the DVD/CD compatible reproducing apparatus having two light sources, when the first light source 10 is irradiated from one surface of the first beam splitter 13, the second light source 15 must be irradiated from another surface perpendicular to the first light source 10, causing a problem that a large space is required for accommodating the optical system and accordingly the optical pickup apparatus has a larger size.

OBJECT AND SUMMARY OF THE INVENTION

The present invention has been made in view of the problem mentioned above, and the object of the present invention is to provide an optical pickup apparatus which is capable of supporting multiple wavelengths in a reduced size without using an optical combining element such as an optical prism.

According to the present invention, there is provided an optical pickup apparatus for reading information from a plurality of types of discs at different reading wavelengths, which comprises an optical pickup apparatus includes a light source having a plurality of integrated light emitting portions for emitting laser beams of different wavelengths, the light source being adapted to selectively emit one of the laser beams of different wavelengths; a photodetector for detecting the laser beam; and an optical system for directing the laser beam emitted from the light source to the disc, and for directing the laser beam reflected by the disc to the photodetector, wherein the light source is positioned such that a straight line connecting respective light emitting points of the plurality of light emitting portions is coincident with a tangential line of a track on a disc to be reproduced.

According to another aspect of the present invention, the optical system includes an astigmatism element for providing the laser beam with astigmatism, and the photodetector includes a plurality of four-division light receiving sections arranged corresponding to each of the plurality of laser beams of different wavelengths, and is configured such that central division lines of the four-division light receiving sections are in alignment with one another; and the photodetector is disposed such that the central division lines are coincident with the tangential line of the track.

According to another aspect of the present invention, the optical system includes an astigmatism element for providing the laser beam with astigmatism, and a diffraction element for generating a pair of subbeams from the laser beam; the photodetector includes a plurality of four-division light receiving sections arranged in correspondence to each of the plurality of laser beams of different wavelengths, the plurality of four-division light receiving sections being arranged such that central division lines thereof are in alignment with one another; the photodetector further includes a pair of subbeam receiving sections, disposed one after the other in a direction in which the central division lines extend, for receiving the subbeams; and the plurality of four-division light receiving sections are arranged such that one of the subbeams is received by a different four-division light receiving section adjacent to a four-division light receiving section which receives the selected laser beam.

According to another aspect of the present invention, the optical system includes an astigmatism element for providing the laser beam with astigmatism, and a diffraction element for generating a pair of subbeams from the laser beam; the photodetector includes a plurality of four-division light receiving sections arranged in correspondence to each of the plurality of laser beams of different wavelengths, the plurality of four-division light receiving sections arranged such that central division lines thereof are in alignment with one another; the photodetector further includes a pair of subbeam receiving sections, disposed one after the other in a direction in which the central division lines extend, for receiving the subbeams; and the subbeam receiving sections are formed with regions which can receive all subbeams generated from all the laser beams of different wavelengths emitted from the light source.

According to another aspect of the present invention, the optical system includes an astigmatism element for providing the laser beam with astigmatism, and a diffraction element for generating a pair of subbeams from the laser beam; the photodetector includes a plurality of four-division light receiving sections arranged in correspondence to each of the plurality of laser beams of different wavelengths, the plurality of four-division light receiving sections arranged such that central division lines thereof are in alignment with one another; two divisional regions of the four-division light receiving section for receiving an arbitrary laser beam serves as two divisional regions of a four-division light receiving section for receiving a laser beam of a different wavelength from that of the arbitrary laser beam; and the remaining two divisional regions other than the two divisional regions are also used as a subbeam receiving section for receiving the subbeam.

According to another aspect of the present invention, the light source is a one-chip laser diode which is formed with one electrode as a common electrode for the plurality of light emitting portions.

DETAILED DESCRIPTION OF THE PREFERRED EMBODIMENTS

Figure 1:
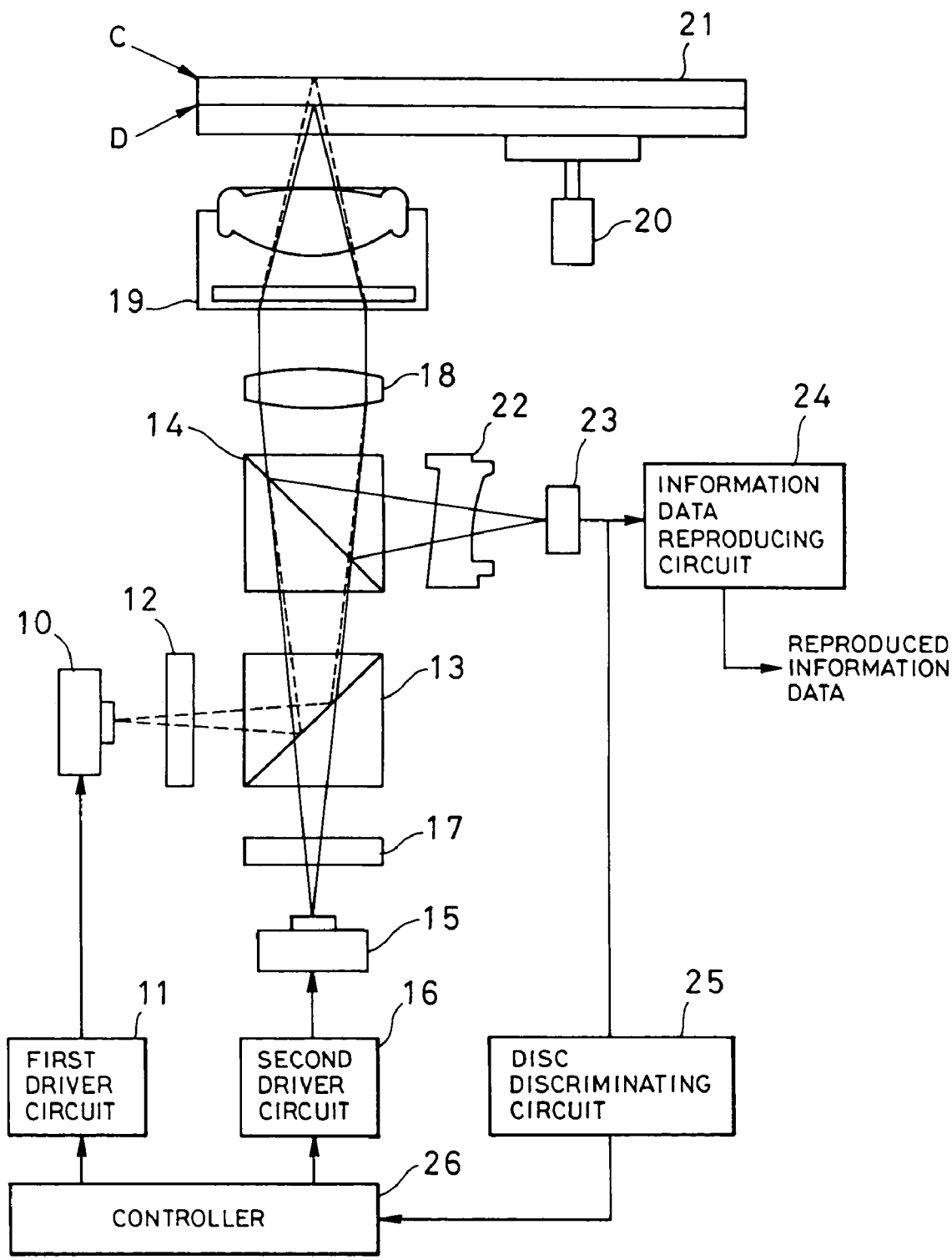
FIG. 1 is a schematic diagram of an optical pickup apparatus in the prior art.
Figure 2:
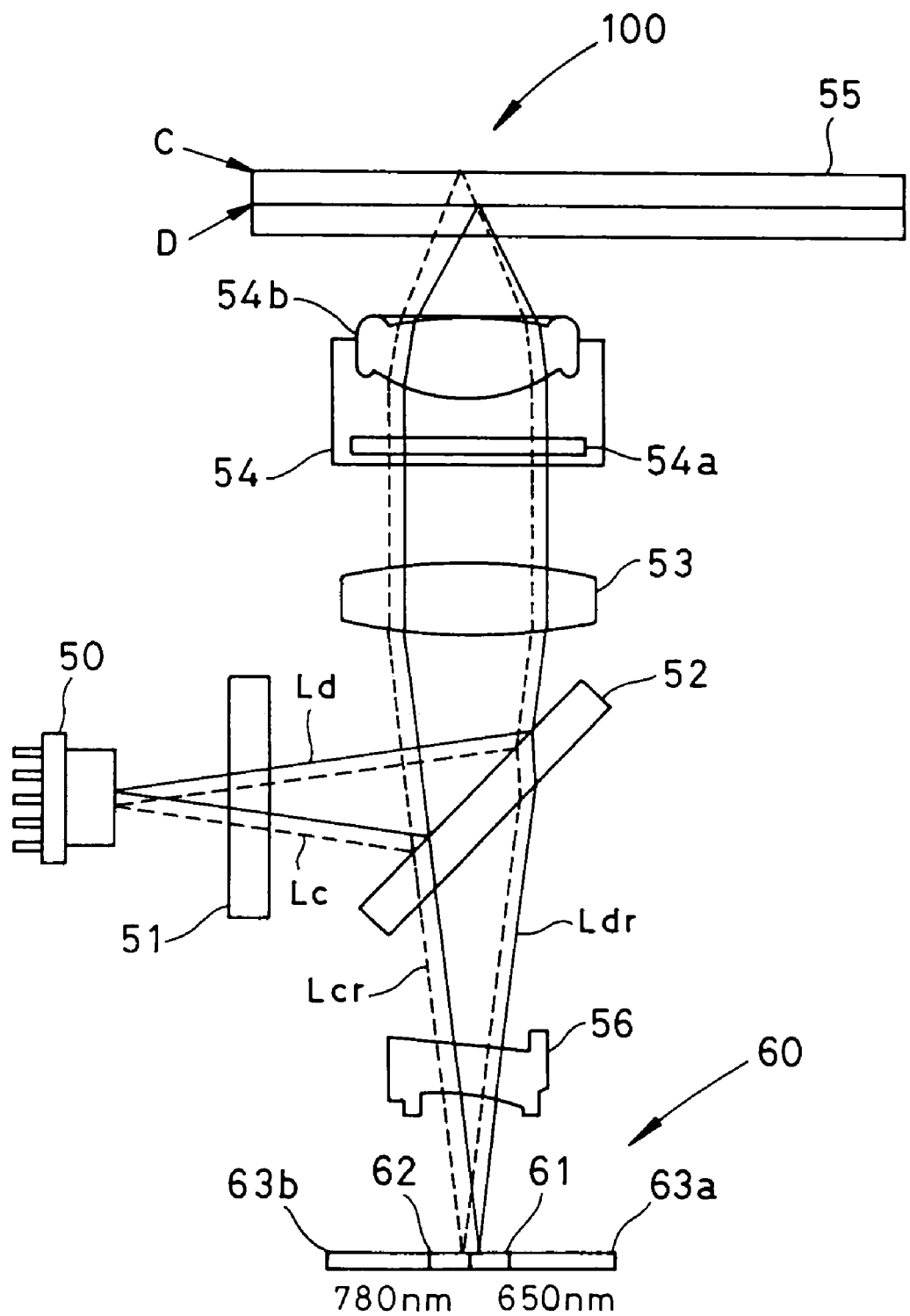
FIG. 2 is a schematic diagram of an optical pickup apparatus according to a first embodiment of the present invention.

Embodiments of the present invention will hereinafter be described in connection with an optical pickup apparatus, taken as an example, for reproducing DVD and CD or CDR which differ from each other in reading wavelength. It should be understood however that reproduced information recording media are not limited to the foregoing, and the present invention can be applied to any optical pickup apparatus as long as it reproduces a plurality of types of discs with different reading wavelengths. FIG. 2 is a schematic diagram of a main portion of an optical pickup apparatus 100 according to a first embodiment of the present invention. The configuration of the optical pickup apparatus 100 will be described with reference to FIG. 2.

A semiconductor laser 50 serving as a light source selectively emits laser beams of two different wavelengths. A grating lens 51 serving as a diffraction element generates a pair of subbeams from a laser beam. A half mirror 52 reflects a laser beam emitted from the semiconductor laser device 50 and transmits the laser beam reflected from an information recording surface of a disc 55. A collimator lens 53 transforms the laser beam into parallel light. A bifocal lens 54 focuses at different positions on the same straight line to form beam spots of appropriate sizes corresponding to the sizes of respective information pits. A cylindrical lens 56 serving as an astigmatism element provides a laser beam with astigmatism. A photodetector 60 serving as a light detecting means receives the laser beam.

Thus, an astigmatism method is employed for focus adjustment and a three-beam method is employed for tracking servo adjustment in the first embodiment. It should be noted that electric circuits such as a driver circuit for driving the semiconductor laser device 50, a disc discriminating circuit, and so on are similar to the prior art example, so that they are omitted in the description.

Figure 3:
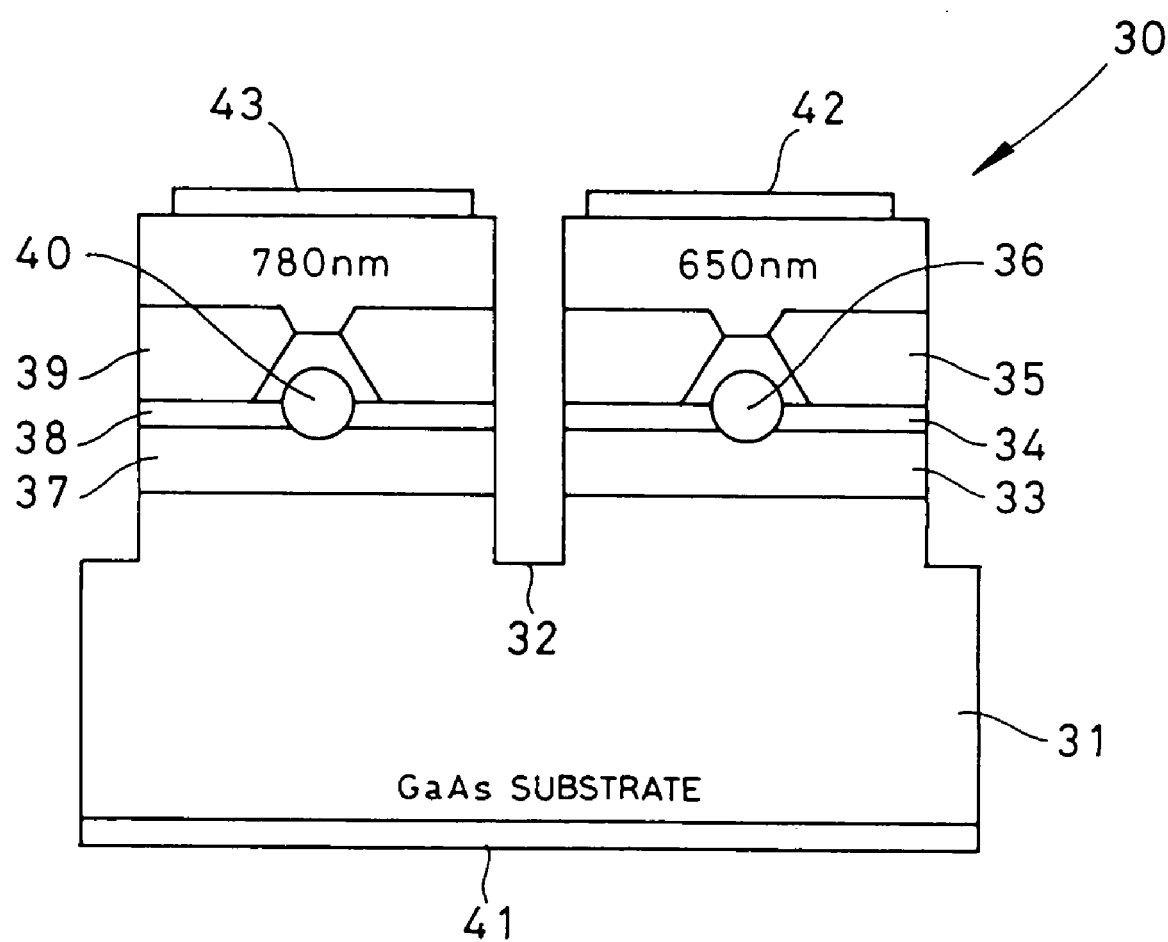
FIG. 3 is a schematic diagram of a semiconductor laser device used in the optical pickup apparatus according to the first embodiment of the present invention.
Figure 4:
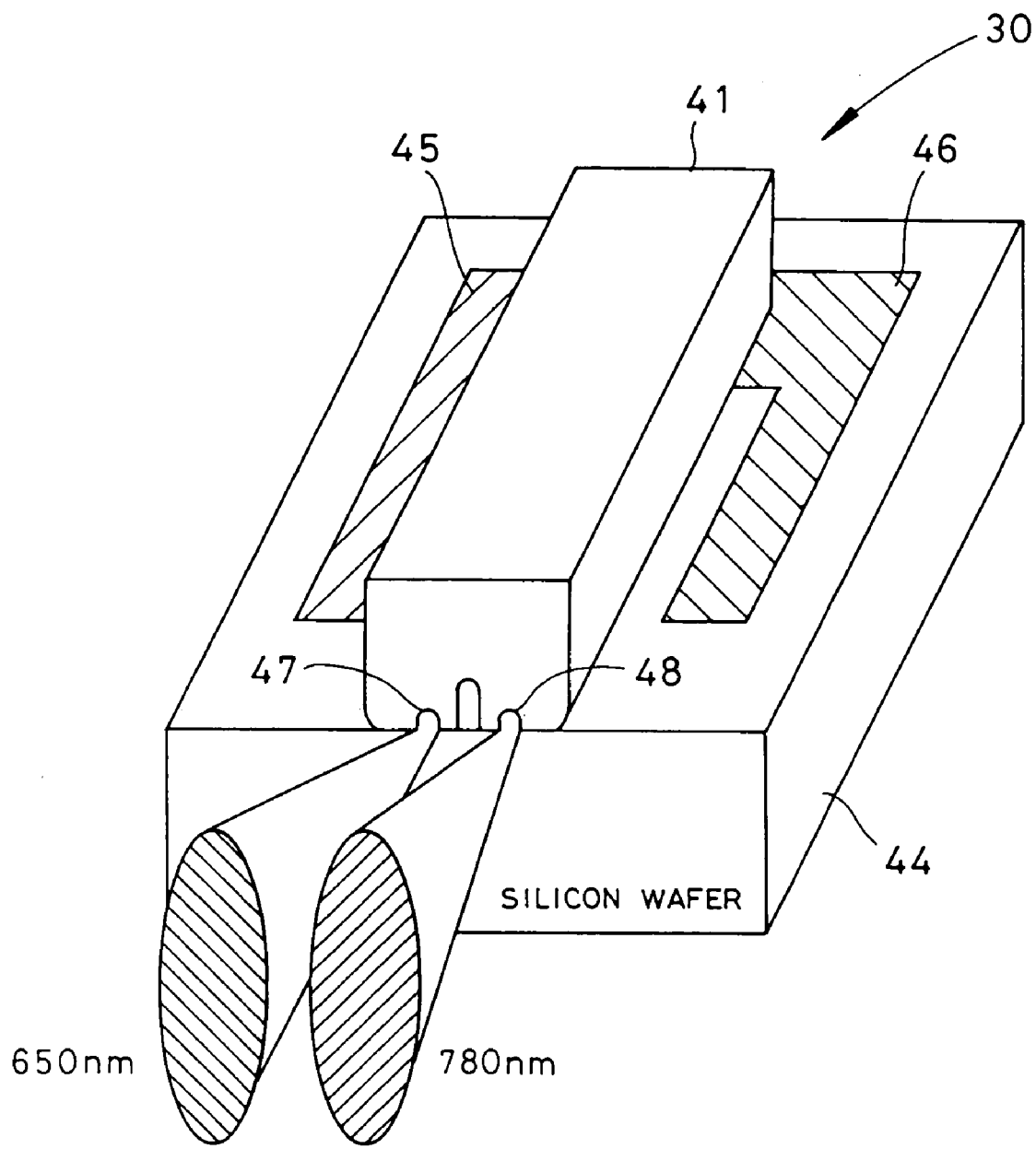
FIG. 4 is a perspective view of the semiconductor laser device used in the optical pickup apparatus according to the first embodiment of the present invention.

The semiconductor laser device 50 is a one-chip laser diode 30 which emits a laser beam having a wavelength of 780 nm for reading a CD and a CDR, and a laser beam having a wavelength of 650 nm for reading a DVD. FIG. 3 illustrates a cross-sectional view of the one-chip laser diode 30, and FIG. 4 illustrates a submount of the one-chip laser diode 30.

As illustrated in FIG. 3, the one-chip laser diode 30 comprises a GaAs substrate 31 having dimensions on the order of 300 μm×400 μm×100–120 μm. An n-type $Al_XGa_YIn_{1-X-Y}P$ layer 33, an $Al_XGa_YIn_{1-X-Y}P$ active layer 34, and a p-type $Al_XGa_YIn_{1-X-Y}P$ layer 35 are stacked on the GaAs substrate 31. A 650-nm light emitting portion 36 for emitting a laser beam with wavelength of 650 nm (hereinafter referred to as the "first laser beam") is formed in the middle of the active layer 34. The one-chip laser diode 30 also comprises an n-type $Al_XGa_{1-X}As$ layer 37, an $Al_XGa_{1-X}As$ active layer 38, and a p-type $Al_XGa_{1-X}As$ layer 39 stacked on the GaAs substrate 31. A 780-nm light emitting portion 40 for emitting a laser beam with wavelength of 780 nm (hereinafter referred to as the "second laser beam") is formed in the middle of the active layer 38. The two active layers 34, 38 of approximately 4 μm in thickness are separated by a separation groove 32, and the 650-nm light emitting portion 36 and the 780-nm light emitting portion 37 are formed with a spacing of approximately 100 nm interposed therebetween.

The one-chip laser diode 30 is also formed with a common electrode 41 on the bottom surface of the GaAs substrate 31, a Au electrode 42 on the top surface of the 650-nm light emitting portion 36, and a Au electrode 43 on the top surface of the 780-nm light emitting portion 40, respectively. In other words, the one-chip laser diode 30 is a semiconductor laser device 50 which is formed with one of electrodes associated with the first and second light sources as a common electrode. The one-chip laser diode 30 is used in such a form that it is mounted on a silicon submount 44 which is formed with two Al electrodes 45, 46, as illustrated in FIG. 4.

It should be noted that a "one-chip" device generally refers to a device which comprises a plurality of active layers of different types formed in one chip by, for example, a selective area growth to enable the device to output laser beams at a plurality of wavelengths, whereas the "one-chip" device as used in the present invention also contemplates a device which is formed with a plurality of laser devices each for emitting a laser beam with a wavelength which are fabricated, for example, on a silicon wafer in a hybrid manner, i.e., a unit device which comprises a plurality of integrated one-wavelength laser devices.

The Al electrode 45 for 650-nm laser and the Al electrode 46 for 780-nm laser are formed On the silicon submount 44, and the one-chip laser diode 30 is mounted thereon with the common electrode 41 oriented upward. The Au electrode 42 for 650-nm laser and the Au electrode 43 for 780-nm laser are soldered to the Al electrodes 45, 46, respectively, and for use, the common electrode 41 and the two Al electrodes 45, 46 are soldered to lead lines (not shown). Then, as a predetermined voltage is applied between the common electrode 41 and the Al electrode 45, the first laser beam with wavelength of 650 nm is emitted from a light emitting window 47. Also, as a predetermined voltage is applied between the common electrode 41 and the Al electrode 46, the second laser beam with wavelength of 780 nm is emitted from a light emitting window 48. The one-chip laser diode 30 on the submount is accommodated, for example, in a case provided with a light emitting window and a plurality of output terminals (not shown), and used as the semiconductor laser device 50.

As described above, the semiconductor laser device 50 used in the optical pickup apparatus 100 according to the first embodiment of the present invention has the 650-nm light emitting portion 36 for emitting the first laser beam and the 780-nm light emitting portion 37 for emitting the second laser beam formed in one chip spaced only by approximately 100 nm. Therefore, it is possible to remove the feature corresponding to the second beam splitter, which has been conventionally required, if the two light emitting portions are regarded to be at substantially the same light emitting position. Strictly speaking, however, since the two light emitting portions 36, 37 are different in position from each other, the positional relationship between the two light emitting portions 36, 37 must be considered for the optical axis of the objective lens, as explained below.

Figure 5:
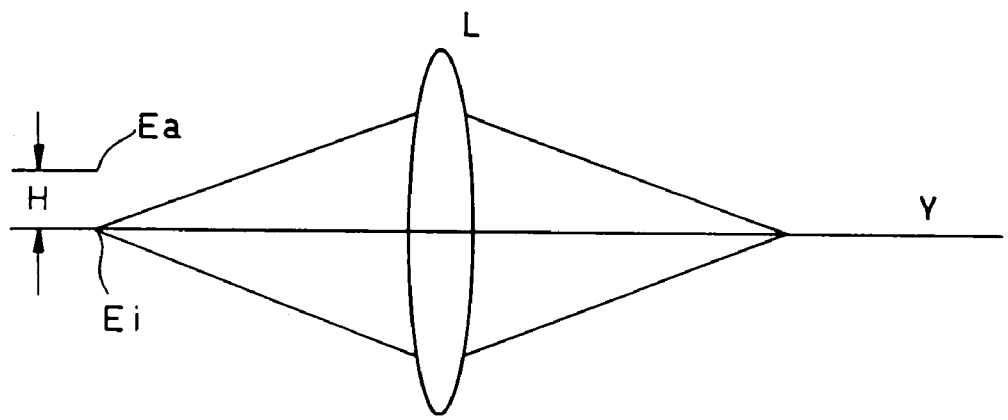
FIG. 5 is a diagram illustrating a relationship between a light source and a center axis of a lens.

This positional relationship will be explained with reference to FIGS. 5 and 6. As illustrated in FIG. 5, it has been found that the beam spot diameter of the converged light is minimized when a light source Ei is positioned on the central axis Y of an objective lens L. Therefore, the light source Ei positioned on the center axis Y of the objective lens L can be regarded as an ideal light emitting point. However, when the actual center Ea of the light source Ei is not coincident with the optical axis Y, an "image height" H and hence "aberration" occurs. Since the aberration adversely affects a read signal, it should be desirably reduced as much as possible.

Figure 6:
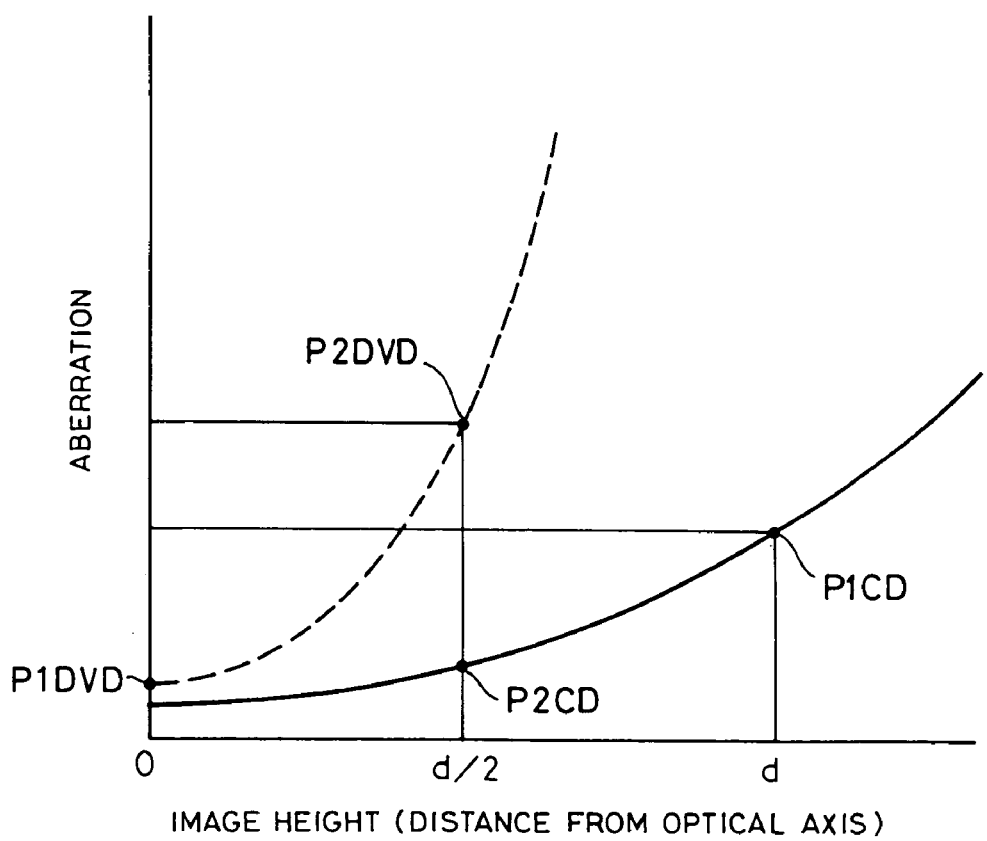
FIG. 6 is a diagram illustrating a relationship between an image height and aberration.

FIG. 6 shows the relationship between the image height and aberration for the semiconductor laser device 50, where a dotted line indicates aberration for the image height when a DVD is reproduced, and a solid line indicates aberration for the image height when the CD is reproduced. As can be seen from FIG. 6, the aberration during reproduction of a DVD is larger irrespective of the image height as compared with the aberration during reproduction of the CD, since a larger NA and a smaller beam spot diameter are used for the DVD as compared with the CD. The increase rate of the aberration during reproduction of the DVD (the slop of the dotted line) is larger than the increase rate of the aberration during reproduction of the CD (the slop of the solid line).

Therefore, the semiconductor laser device 50 used in the optical pickup apparatus 100 according to the first embodiment of the present invention is set such that the 650-nm light emitting portion 36 for emitting the first laser beam is positioned on the center axis of the optical system, or the distance from the 650-nm light emitting portion 36 to the center axis of the optical system is shorter than the distance from the 780-nm light emitting portion 40 for emitting the second laser beam to the center axis of the optical system. In other words, the image height deviation is reduced for the DVD, which is more adversely affected by the image height deviation due to the aberration, as compared with the CD.

The configuration of the photodetector 60 used in the first embodiment of the present invention will be described with reference to FIG. 9. It should be noted that the photodetector 60 is configured to detect, in addition to a read signal, a focus error signal in accordance with the astigmatism method and a tracking error signal in accordance with the three-beam method since the first embodiment performs the focus servo adjustment using the astigmatism method and the tracking servo using the three-beam method.

Figure 9:
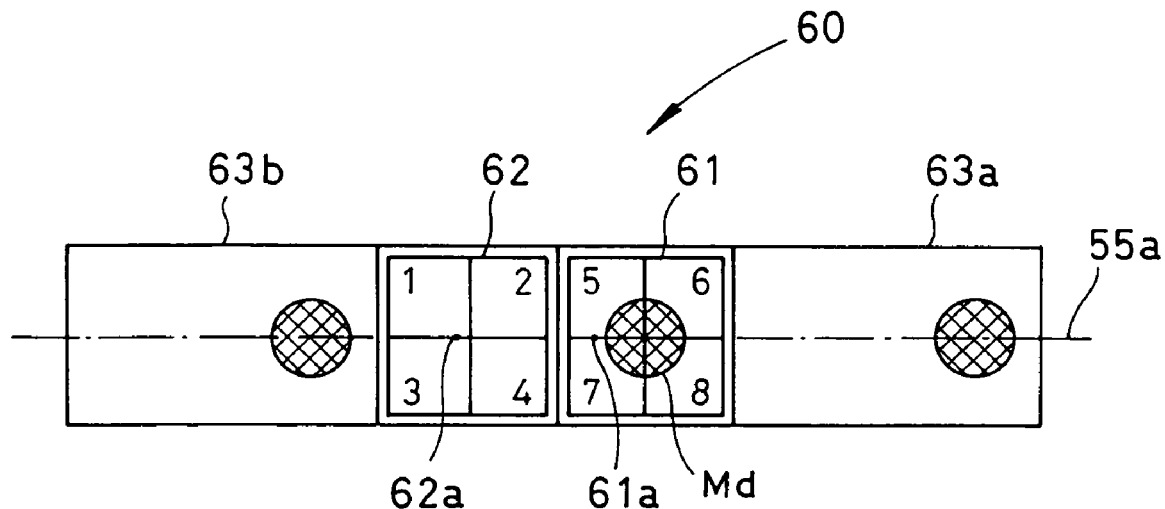
FIG. 9 is a diagram showing the positional relationship between a light source and a track of a disc and a photodetector.

As illustrated in FIG. 9, the photodetector 60 has a first four-division light receiving section 61 which receives a main beam of the first laser beam to generate a read signal and a focus error signal of the first laser beam; a second four-division light receiving section 62 which receives a main beam of the second laser beam to generate a read signal and a focus error signal of the second laser beam; and a pair of first and second subbeam receiving sections 63a, 63b which receive subbeams of the first and second laser beams, respectively, to generate tracking error signals thereof. The first four-division light receiving section 61 and the second four-division light receiving section 62 are positioned such that a central division line 61a of the former and a central division line 62a of the latter are in alignment with each other, and the first and second subbeam receiving sections 63a, 63b are positioned on extended lines of the central division lines 61a, 62a in front of and at the back of the first and second four-division light receiving sections 61, 62. The reason for which the first four-division light receiving section 61 and the second four-division light receiving section 62 are positioned such that the central division line 61a and the central division line 62a are in alignment with each other will be described later.

Figure 7:
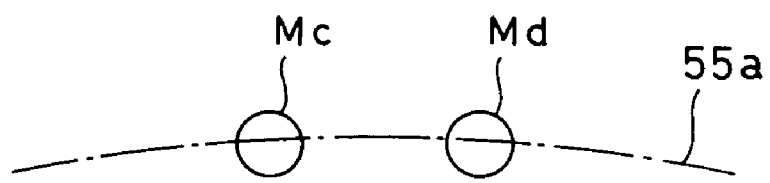
FIG. 7 is a diagram showing the positional relationship between a light source and a track of a disc and a photodetector.

The positional relationship among the two light emitting portions 36, 37 of the light source for a track 55a on the disc 55 and the photodetector 60 will be described with reference to FIGS. 7 to 9. In FIG. 7, Md indicates a spot of the first laser beam irradiated on the disc, and Mc indicates a spot of the second laser beam irradiated on the disc.

Figure 8:
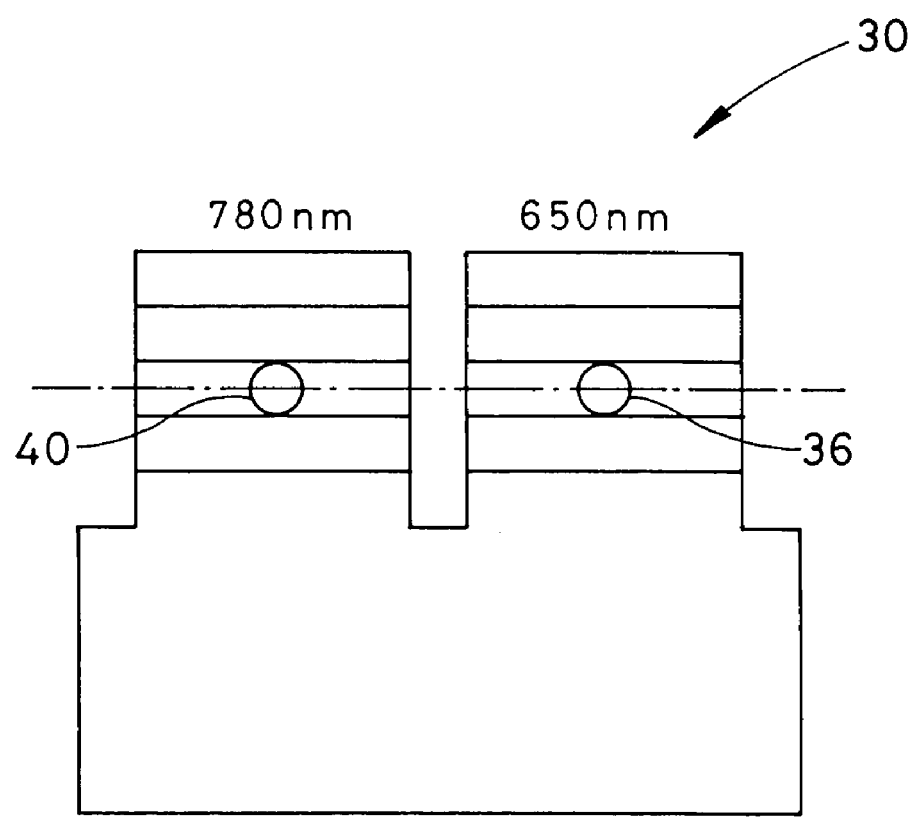
FIG. 8 is a diagram showing the positional relationship between a light source and a track of a disc and a photodetector.

The positional relationship between the track 55a on the disc 55 and the first laser beam emitting portion 36 and the second laser beam emitting portion 40 of the semiconductor laser device 50 is set such that a straight line connecting light emitting points of the respective light emitting portion 36 and light emitting portion 40 is in parallel with a tangential line of the track 55a on the disc 55 to be reproduced as illustrated in FIGS. 7 and 8.

Also, as illustrated in FIGS. 7 and 9, the positional relationship between the track 55a on the disc 55 and the photodetector 60 is set such that the central division line 61a and the central division line 62a are coincident with the tangential line of the track 55a.

In this way, the photodetector 60 configured such that the central division line 61a of the first four-division light receiving section 61 is in alignment with the central division line 62a of the second four-division light receiving section 62, and the positional relationship of the two light emitting portions 36, 37 of the light source and the photodetector 60 for the track 55a of the disc 55 is set as described above in order to avoid an adverse influence, i.e., an offset occurring in an focus error at the moment a tracking error signal is generated, the reason for which will be explained below.

The influence of the positional relationship between the central division lines of the four-division light receiving sections and the tangential line of the track exerted on the focus error signal will be explained with reference to FIGS. 10 and 11. These figures show the positional relationship of a track on a disc and the four-division light receiving sections, and the position and a light amount distribution of a beam spot (spot of true circle), for which the focus servo has been properly adjusted in the illustrated state, in connection with an example in which the first laser beam is received by the first four-division light receiving section 61.

Figure 10:
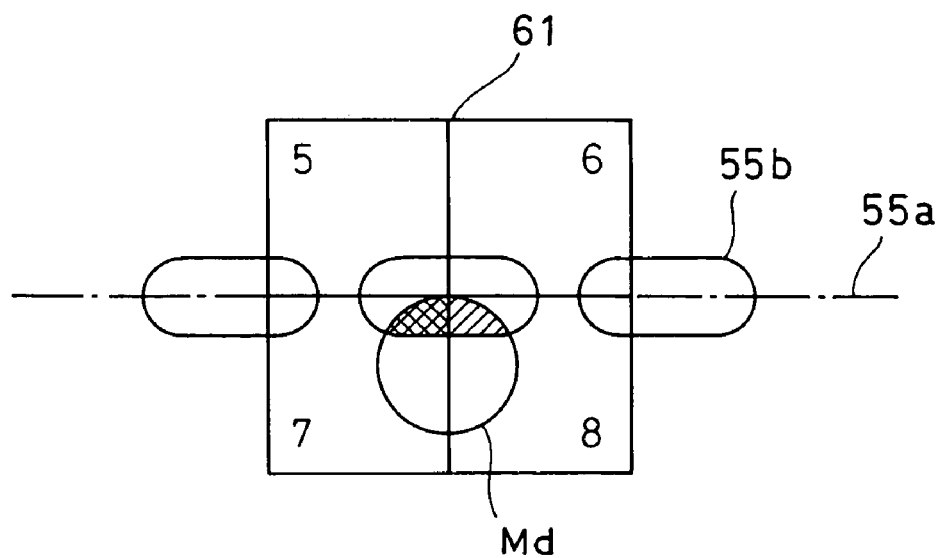
FIG. 10 is a diagram illustrating the influence of an off-track spot on a focus error signal.
Figure 11:
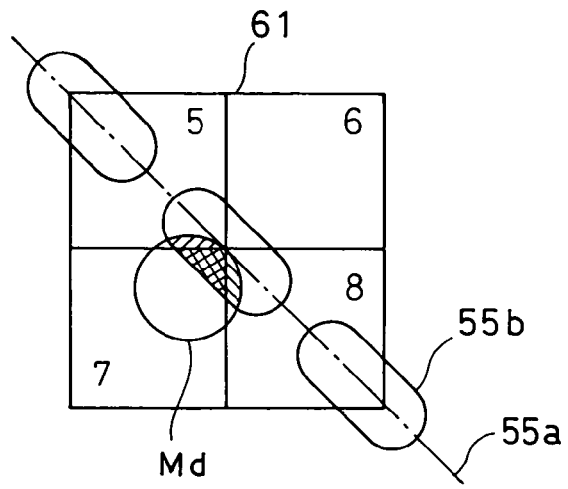
FIG. 11 is a diagram illustrating the influence of an off-track spot on a focus error signal.

FIG. 10 shows that the track 55a is positioned coincident with the central division line 61a of the first four-division light receiving section 61, and the beam spot deviates from the track (a tracking error exists), and FIG. 11 shows, as a comparative example in the first embodiment, that the track 55a is positioned not coincident with the central division line 61a of the first four-division light receiving section 61, and the beam spot deviates from the track.

Generally, the photodetector 60 of the optical pickup apparatus 100 determines the presence or absence of a pit 55b recorded on a disc based on the amount of reflected light. A total amount of light can be found from the amount of light per unit area and a light receiving area. As the beam spot is formed on the pit 55b, the laser beam irradiated on the pit 55b experiences diffused reflection to reduce the amount of reflected light. Thus, the reflected light becomes darker and the photodetector 60 receives a smaller amount of light (portions indicated by hatchings in FIGS. 10 to 12). On the other hand, the laser beam experiences total reflection on the mirror surface of the disc where the pit 55b is not formed, so that the reflected light is bright and the photodetector 60 receives a larger amount of light.

As is well known, the focus error signal is obtained by a diagonal calculation of four-division light receiving elements, i.e., a calculation of (5+8)−(6+7). In the case illustrated in FIG. 10, a detected focus error signal is zero since the light receiving elements 7, 8 have the same light receiving area and the same light amount distribution, so that a proper focus servo adjustment can be made. In other words, the focus error signal is not affected even if off-track occurs when the track 55a (track tangential line) is in alignment with the central division line 61 of the four-division light receiving section 61.

However, in the case illustrated in FIG. 11, as is apparent from the illustrated light receiving areas and light amount distribution, a detected focus error signal is not zero, and an offset is added thereto. Specifically, when the track 55a is not in alignment with the central division line 61a of the four-division light receiving section 61 but is inclined with respect thereto, a detected focus error signal will not be zero and is affected by the offset due to the occurrence of off-track even if the focus is appropriately adjusted (free of focus error).

Therefore, it is taken into consideration in the present invention that the alignment of the track 55a with the central division line 61a of the four-division light receiving section 61 required to appropriately perform the focus servo adjustment in accordance with the astigmatism method, and the photodetector 60 is configured such that the central division line 61a of the first four-division light receiving section 61 is in alignment with the central division line 62a of the second four-division light receiving section 62, and moreover the central division lines 61a and 62a are made coincident with the tangential line of the track 55a. Additionally, the respective light emitting portions 36, 40 of the semiconductor laser device 50 are arranged such that a line connecting their light emitting points is in parallel with the tangential line of the track 55a.

With the foregoing configuration, the track 55a can be coincident with the central division lines 61a, 62a of the first and second four-division light receiving sections 61, 62 when the DVD is reproduced with the spot of the first laser beam or when the CD is reproduced with the second laser beam, thereby making it possible to appropriately perform the focus servo adjustment in accordance with the astigmatism method. Also, since the first four-division light receiving section 61 and the second four-division light receiving section 62 can be configured as an eight-division light receiving section arranged in two rows and four columns, the formation can be readily carried out.

The operation of the optical pickup apparatus 100 according to the first embodiment of the present invention will be described with reference to FIG. 2. In brief, the optical pickup apparatus 100 is controlled in a manner such that only one of light sources of the semiconductor laser device 50 is driven on the basis of the disc discrimination result.

For reproducing a DVD disc 55, incident light Ld (indicated by solid lines in the figure) of the first laser beam emitted from the semiconductor laser device 50 is partially reflected by the half mirror 52 through the grating lens 51, transformed into parallel light flux by the collimator lens 53, and incident on the bifocal lens 54. The laser beam incident on the bifocal lens 54, then, is diffracted to zero-order light, ±first-order light and other higher-order light by the diffraction element 54a. The zero-order light of the laser beam diffracted by the diffraction element 54a forms a beam spot on a track on the information recording surface D of the disc 55 by way of an objective lens 54b. Return light Ldr of the first laser beam reflected by the information recording surface D of the DVD passes through the bifocal lens 54 and the collimator lens 53, partially transmits the half mirror 52, passes through the cylindrical lens 56, and impinges on the first four-division light receiving section 61 of the photodetector 60.

The diffraction element 54a is provided for limiting spherical aberration caused by a difference in thickness between surface substrates (or cover layers) of the DVD and the CD, and is formed such that no spherical aberration occurs on the information recording surface D by diffracting with the zero-order light when the first laser beam impinges thereon.

On the other hand, for reproducing the CD disc 55, incident light Lc (indicated by solid lines in the figure) emitted from the semiconductor laser device 50 is partially reflected by the half mirror 52 through the grating lens 51, transformed into parallel light flux by the collimator lens 53, and incident on the bifocal lens 54. First-order light of the incident light Lc of the second laser beam diffracted by the diffraction element 54a is converged by the objective lens 54b to form a beam spot on an information recording surface C of the disc 55. The diffraction element 54a is formed such that no spherical aberration occurs on the information recording surface C by diffracting with the first-order light, when the laser beam impinges thereon. Then, return light Lcr of the second laser beam reflected by the information recording surface C of the CD passes through the bifocal lens 54 and the collimator lens 53, partially transmits the half mirror 52, passes through the cylindrical lens 56, and impinges on the second four-division light receiving section 62 of the photodetector 60.

Figure 12:
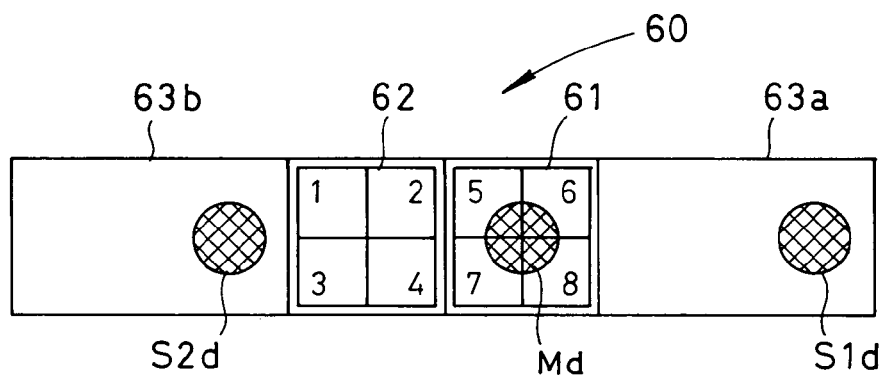
FIG. 12 is a schematic diagram of a photodetector used in the optical pickup apparatus according to the first embodiment of the present invention.
Figure 13:
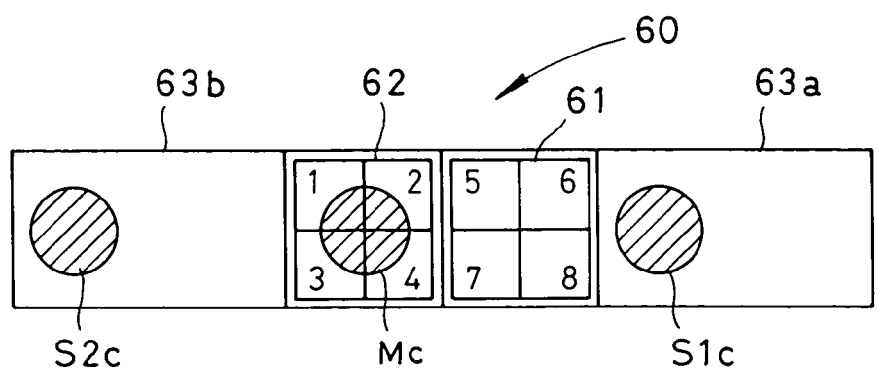
FIG. 13 is a schematic diagram of the photodetector used in the optical pickup apparatus according to the first embodiment of the present invention.

FIGS. 12 and 13 illustrates how the photodetector 60 receives the laser beams. More specifically, FIG. 12 is a plan view illustrating how the photodetector 60 receives three beams (a main beam Md and subbeams S1d, S2d) of the first laser beam during reproduction of the DVD, and FIG. 13 is a plan view illustrating how the photodetector 60 receives three beams (a main beam Mc and subbeams S1c, S2c) of the second laser beam during reproduction of the CD.

The photodetector 60, when irradiated with the three beams of the first laser beam, receives a beam spot of the main beam Md at the center of the first four-division light receiving section 61, and receives beam spots of the two subbeams S1d, S2d on first and second subbeam receiving sections 63a, 63b, respectively, as illustrated in FIG. 12. On the other hand, when irradiated with the three beams of the second laser beam, the photodetector 60 receives a beam spot of the main beam Mc at the center of the second four-division light receiving section 62, and receives beam spots of the two subbeams S1c, S2c on the first and second subbeam receiving sections 63a, 63b, respectively, as illustrated in FIG. 13. As is apparent from these figures, the first and second subbeam receiving sections 63a, 63b are made larger than the first and second four-division light receiving sections 61, 62 since the first and second subbeam receiving sections 63a, 63b must receive two kinds of subbeams at different light receiving positions,.

Figure 14:
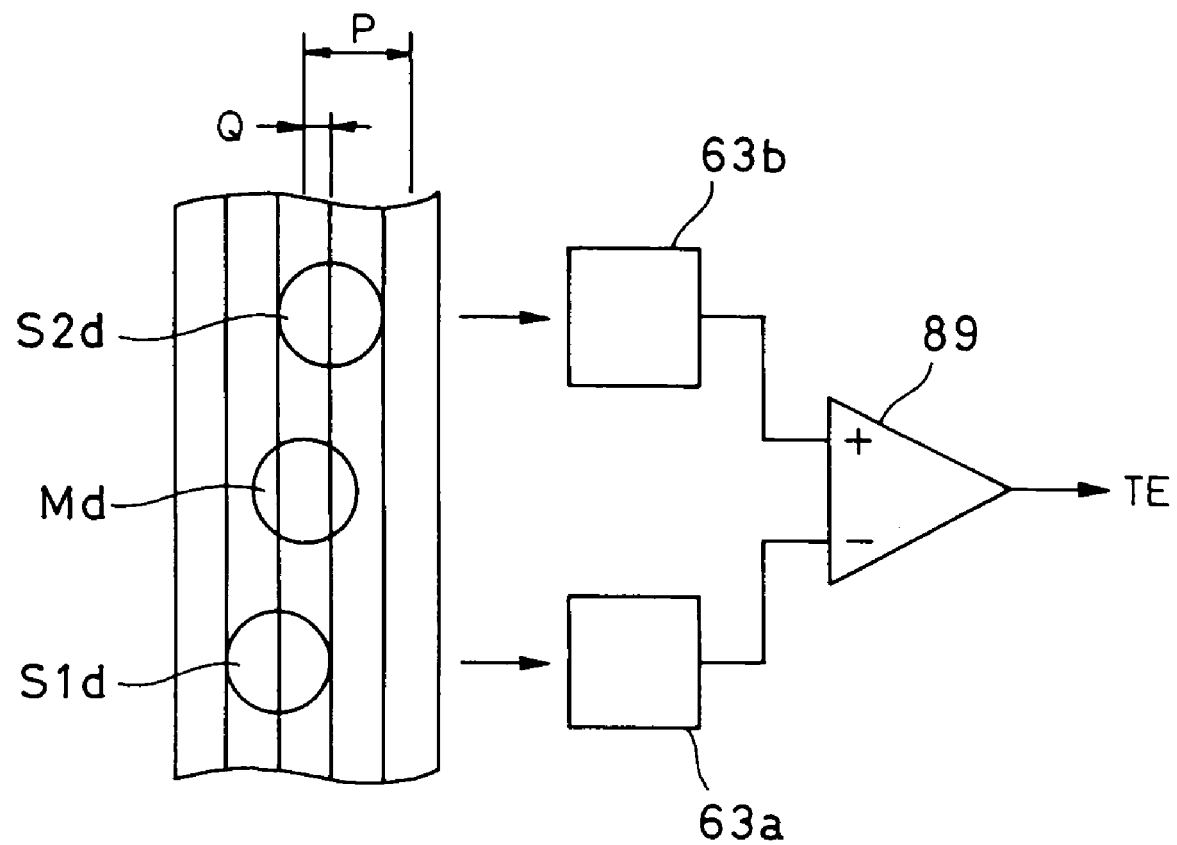
FIG. 14 is a diagram illustrating a three-beam method.
Figure 15A:
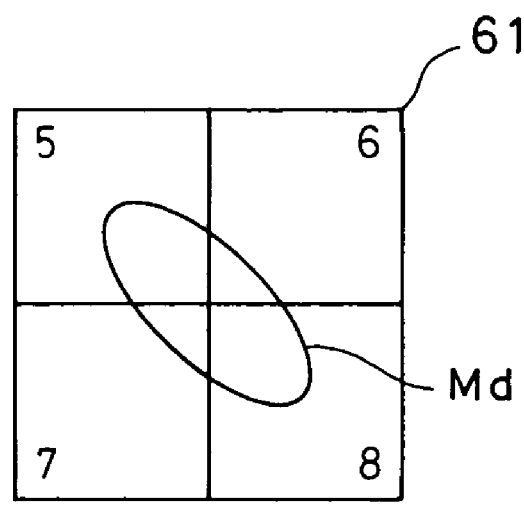
FIG. 15A through 15C are diagrams illustrating an astigmatism method.

The outlines of the three-beam method and the astigmatism method employed in the optical pickup apparatus 100 according to the first embodiment of the present invention will be explained with reference to FIGS. 14 and 15A–15C. FIG. 14 is a diagram showing the relationship between the three beams and the track 55a for explaining the three-beam method, and FIGS. 15A–15C are diagrams illustrating shapes of the main beam for explaining the astigmatism method.

As described above, the optical pickup apparatus 100 according to the first embodiment of the present invention employs the grating lens 51 and the cylindrical lens 56 serving as an astigmatism element in the optical system, so that two subbeams out of the three beams generated by the grating lens 51 are used to detect a tracking error (TE) signal, and the influence of astigmatism on the main beam is detected and used as a focus error (FE) signal.

As illustrated in FIG. 14, in the three-beam method, two subbeam spots S1, S2 are offset by Q from the main beam spot Md in the opposite directions to each other. The offset amount Q is approximately one quarter of a track pitch P. Reflected light of each subbeam spot S1d, S2d is detected by the subbeam receiving sections 63a, 63b. A difference between detection outputs of the subbeam receiving sections 63a, 63b is used as a tracking error (TE) signal. The detected signal is processed by the processing unit 80, which will be described later, to generate a tracking error correction signal.

Figure 15B:
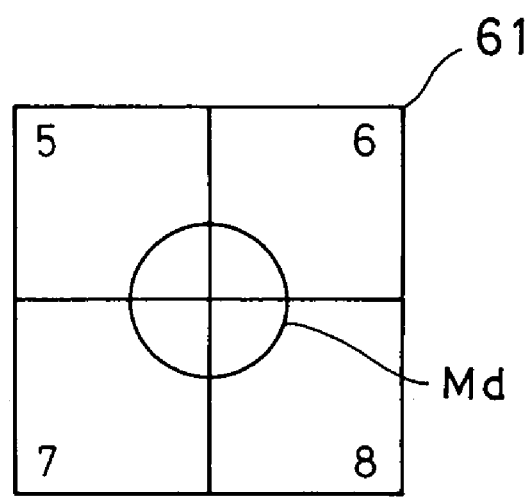
Figure 15C:
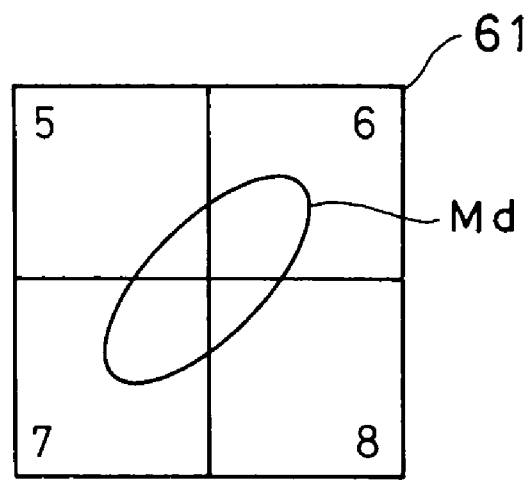

In the astigmatism method, in turn, the beam spot of the main beam Md formed on the first four-division light receiving section 61 appears as a true circle, as illustrated in FIG. 15B. Therefore, the area of the beam spot irradiated to each of light receiving elements 5, 6, 7, 8 of the four-division light receiving section 61 is equal, so that a focus error (FE) signal component is "0".

On the other hand, the beam spot of the main beam Md formed on the first four-division light receiving section 61 appears as an elliptic beam spot in a diagonal direction as illustrated in FIG. 15A or 15C due to the astigmatism characteristic of the cylindrical lens 56 when the beam spot is out of focus. In this case, a total area of the beam spot incident on the light receiving elements 5, 8 on one diagonal is different from a total area of the beam spot incident on the light receiving elements 6, 7 on the other diagonal, and the amount of difference between the two areas is output as the focus error (FE) signal. In other words, the astigmatism method outputs detection signals corresponding to the shapes of the beam spots formed on the respective light receiving elements, and uses the difference between the detection signals as the focus error (FE) signal. The detected signals are processed by the processing unit 80, later described, to generate a focus error correction signal.

Figure 16:
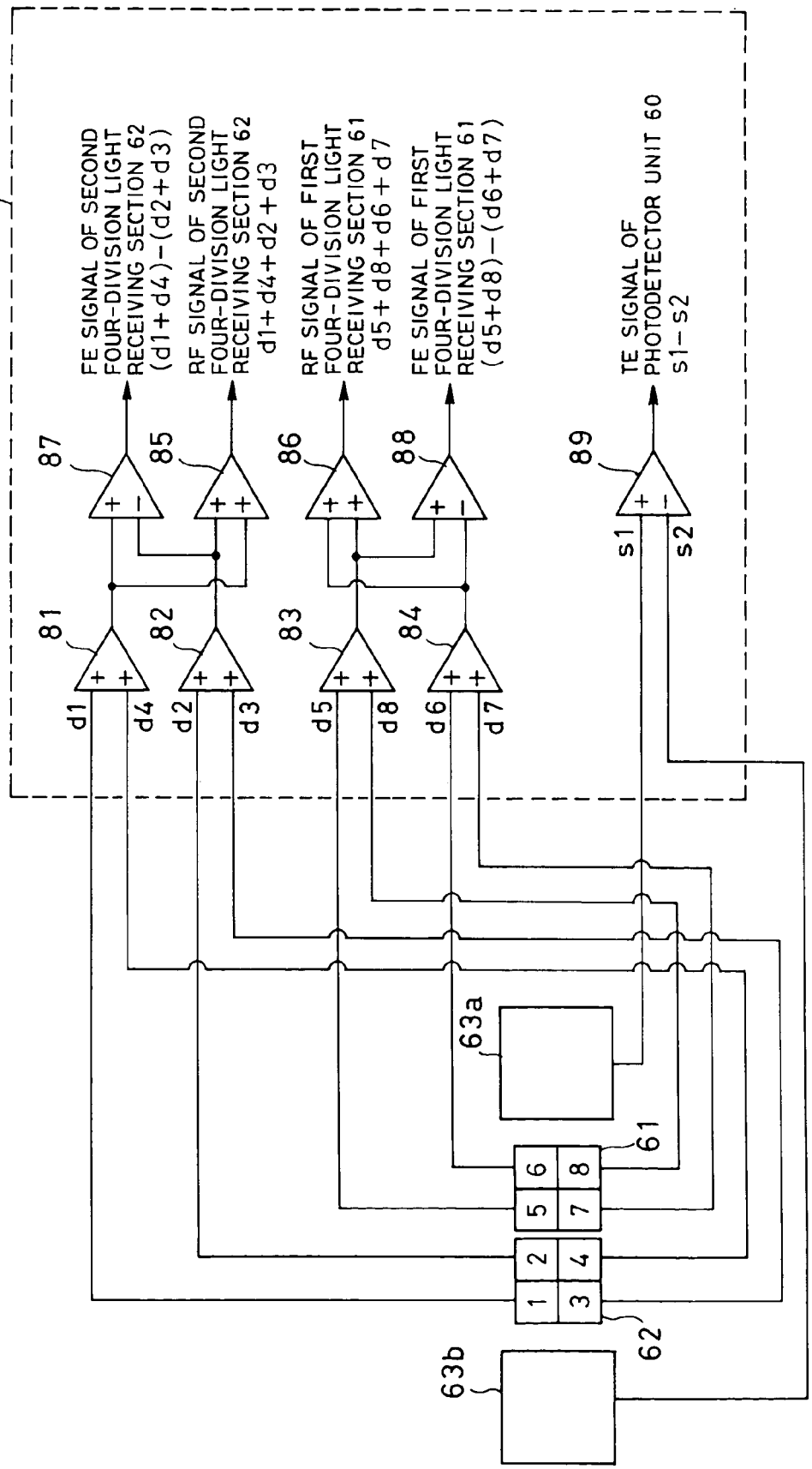
FIG. 16 is a block diagram of a processing unit for processing a detection signal of a photodetector used in the optical pickup apparatus according to the first embodiment of the present invention.

With referrence to FIG. 16, description will be made on the operation of the optical pickup apparatus 100 according to the first embodiment of the present invention for calculating the tracking error (TE) signal, the focus error (FE) signal and an RF signal by means of the photodetector 60.

As illustrated, the processing unit 80 comprises six adders 81–86 and three subtractors 87–89. A detection signal of the first subbeam receiving section 63a is designated by s1; a detection signal of the second subbeam receiving section 63b by s2; and eight detection signals output from the first and second four-division light receiving sections 61, 62 by d1–d8.

The first and second subbeam receiving sections 63a, 63b, which are shared for the first laser beam and the second laser beam, are provided for detecting the tracking error (TE) signal. Subtraction processing is performed for the two detection signals s1, s2 output from the first and second subbeam light receiving sections 63a, 63b in the subtractor 89 to derive s1–s2 which serves as the tracking error (TE) signal for the photodetector 60.

In the first and second four-division light receiving sections 61, 62, the detection signal d1 and the detection signal d4 output from the second four-division light receiving section 62 are added by the adder 81. Also, the detection signal d2 and the detection signal d3 are added by the adder 82. Then, outputs of the adder 81 and the adder 82 are added by the adder 85. An output signal of the adder 85 is expressed by d1+d4+d2+d3 which serves as an RF signal of the second four-division light receiving section 62. Also, subtraction processing is performed for the outputs of the adder 81 and the adder 82 in the subtractor 87. An output signal of the subtractor 87 is expressed by (d1+d4)−(d2+d3) which serves as the focus error (FE) signal of the second four-division light receiving section 62.

On the other hand, the detection signal d5 and the detection signal d8 output from the first four-division light receiving section 61 are added by the adder 83. The detection signal d6 and the detection signal d7 are added by the adder 84. Outputs of the adder 83 and the adder 84 are added by the adder 86. An output signal of the adder 86 is expressed by d5+d8+d6+d7 which serves as an RF signal for the first four-division light receiving section 61. Subtraction processing is performed for the outputs of the adder 83 and the adder 84 in the subtractor 88. An output signal of the subtractor 88 is expressed by (d5+d8)−(d4−d7) which serves as a focus error (FE) signal of the first four-division light receiving section 61.

As described above, the optical pickup apparatus 100 according to the first embodiment of the present invention employs the semiconductor laser device 50, as a light sorce, which comprises a one-chip laser diode 30 for selectively emitting laser beams at two wavelengths. The photodetector 60 comprises the first and second four-division light receiving sections 61, 62 including four light receiving elements for receiving the main beams of the first and second laser beams, and the first and second subbeam receiving sections 63a, 63b for receiving two subbeams, thereby making it possible to satisfactorily carry out the tracking servo adjustment in accordance with the three-beam method and the focus servo adjustment in accordance with the astigmatism method.

Figure 17:
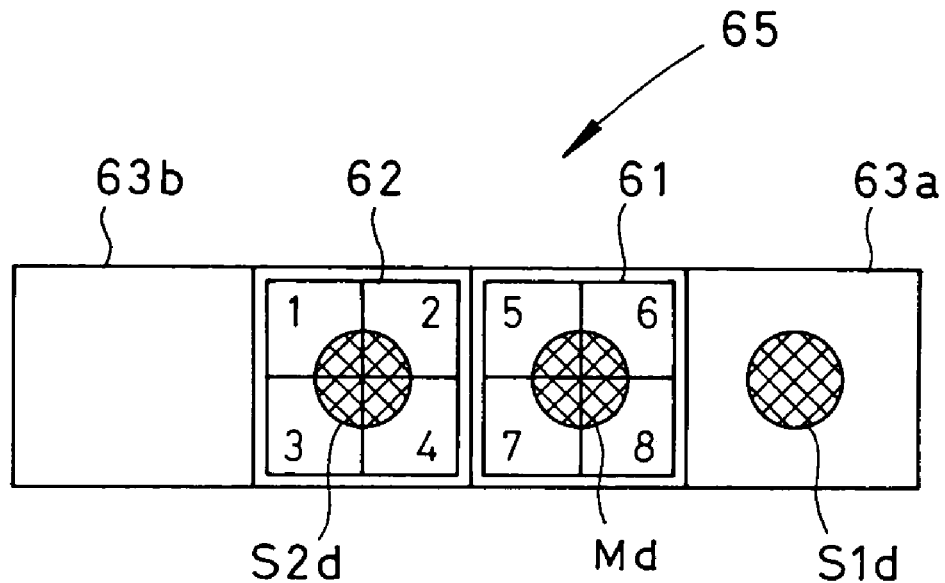
FIG. 17 is a schematic diagram of a photodetector used in an optical pickup apparatus according to a second embodiment of the present invention.
Figure 18:
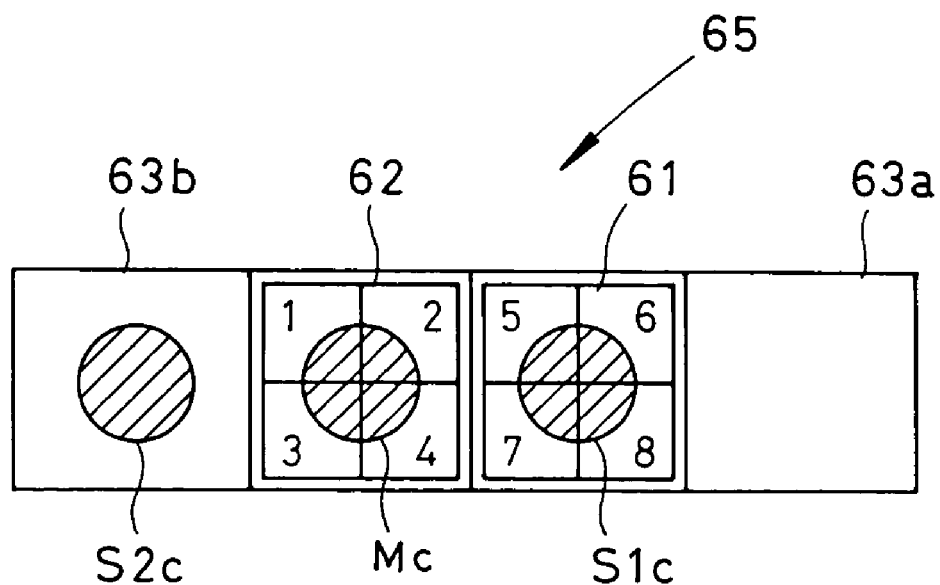
FIG. 18 is a schematic diagram of a photodetector used in the optical pickup apparatus according to the second embodiment of the present invention.

The configuration of a photodetector 65 used in the optical pickup apparatus 100 according to a second embodiment of the present invention will be described with reference to FIGS. 17 and 18. FIG. 17 shows a plan view of the photodetector 65 which receives three beams of the first laser beam, and FIG. 18 shows a plan view of the photodetector 65 which receives three beams of the second laser beam.

As described above, the photodetector 60 used in the optical pickup apparatus 100 according to the first embodiment comprises the first and the second four-division light receiving sections 61, 62 for receiving the main beams, and the first and the second subbeam receiving sections 63a, 63b exclusively for receiving two subbeams, whereas the photodetector 65 used in the optical pickup 100 according to the second embodiment comprises the first and second four-division light receiving sections 61, 62 and first and second subbeam receiving sections 63a, 63b, and is configured such that a main beam of three beams is received by one four-division light receiving section, and subbeams are received by the other four-division light receiving section as well as the subbeam receiving sections.

For example, FIG. 17 shows that the main beam Md of the first laser beam is received by the first four-division light receiving section 61; one subbeam S1d is received by the first subbeam receiving section 63a; and the other subbeam S2d is received by the second four-division light receiving section 62. Also, FIG. 18 shows that the main beam Md of the second laser beam is received by the second four-division light receiving section 62; one sub beam S1c is received by the first four-division light receiving section 61; and the other subbeam S2c is received by the second subbeam receiving section 63b. In other words, one subbeam is received by the four-division light receiving section. This configuration can reduce the sizes of the first and second subbeam receiving sections 63a, 63b as compared with the photodetector 60 used in the optical pickup apparatus 100 according to the first embodiment, thereby making it possible to reduce the size of the optical pickup apparatus 100.

Figure 19:
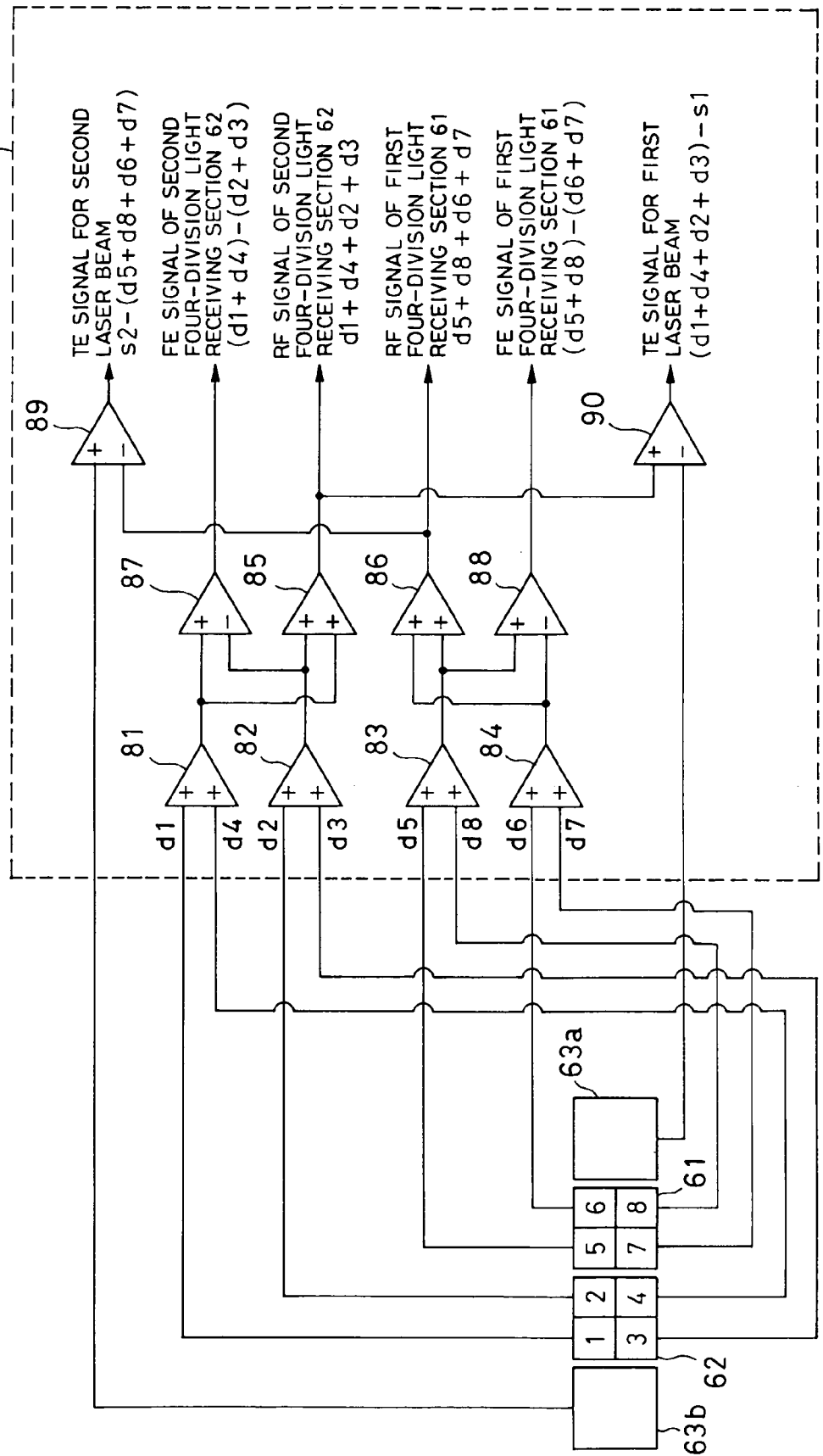
FIG. 19 is a block diagram of a processing unit for processing a detection signal of a photodetector used in the optical pickup apparatus according to the second embodiment of the present invention.

The photodetector 65 used in the optical pickup apparatus 100 according to the second embodiment described above employs a processing unit 80 which comprises six adders 81–86 and four subtractors 87–90, as illustrated in FIG. 19 to calculate the tracking error (TE) signal, the focus error (FE) signal and an RF signal.

As illustrated in FIG. 19, a detection signal d1 and a detection signal d4 output from the second four-division light receiving section 62 are added by an adder 81. Also, a detection signal d2 and a detection signal d3 are added by an adder 82. Outputs of the adder 81 and the adder 82 are added by an adder 85. An output signal of the adder 85 is expressed by d1+d4+d2+d3 which serves as an RF signal of the second four-division light receiving section 62. The output of the adder 82 is subtracted from the output of the adder 81 in a subtractor 87. An output signal of the subtractor 87 is expressed by (d1+d4)−(d2+d3) which serves as a focus error (FE) signal of the second four-division light receiving section 62.

Also, a detection signal d5 and a detection signal d8 output from the first four-division light receiving section 61 are added by an adder 83. A detection signal d6 and a detection signal d7 are added by an adder 84. Outputs of the adder 83 and the adder 84 are added by an adder 86. An output signal of the adder 86 is expressed by d5+d8+d6+d7 which serves as an RF signal of the first four-division light receiving section 61. Subtarction is performed for the outputs of the adder 83 and the adder 84 in a subtractor 88. An output signal of the subtractor 88 is expressed by (d5+d8)−(d4+d7) which serves as a focus error (FE) signal of the first four-division light receiving section 61.

When the first laser beam is received as illustrated in FIG. 17, one subbeam S1d is received by the first subbeam receiving section 63a, and the other subbeam S2d is received by the second four-division light receiving section 62. Therefore, the tracking error (TE) signal for the first laser beam is found by subtracting the detection signal s1 of the first subbeam receiving section 63a from the aforementioned RF signal (d1+d4+d2+d3) of the second four-division light receiving section 62 in the subtractor 90. Therefore, the tracking error (TE) signal for the first laser beam is expressed by (d1+d4+d2+d3)−s1.

On the other hand, when the second laser beam is received as illustrated in FIG. 18, one subbeam S1c is formed on the first four-division light receiving section 61, and the other subbeam S2d is formed on the second subbeam receiving section 63b. Therefore, a tracking error (TE) signal for the second laser beam is found by subtracting the RF signal (d5+d8+d6+d7) of the first four-division light receiving section 61 from the detection output s2 of the second subbeam receiving section 63b in the subtractor 89. Therefore, the tracking error (TE) signal for the second laser beam is expressed by s2−(d5+d8+d6+d7).

Figure 20:
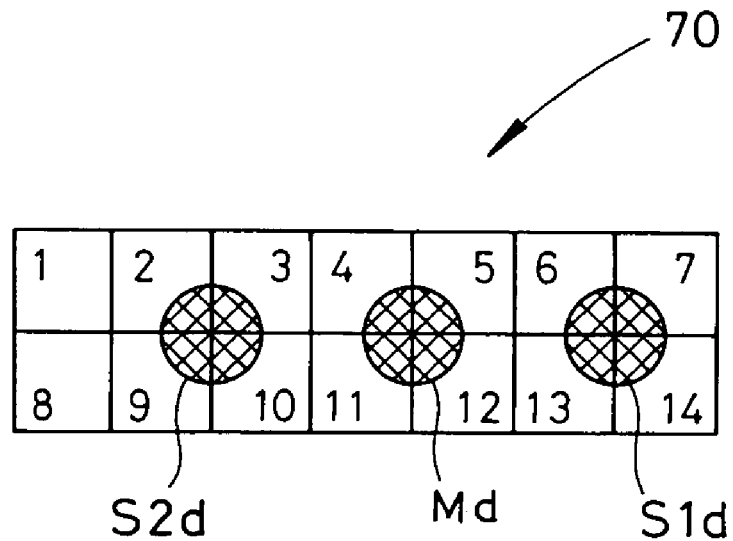
FIG. 20 is a schematic diagram of a photodetector used in an optical pickup apparatus according to a third embodiment of the present invention.
Figure 21:
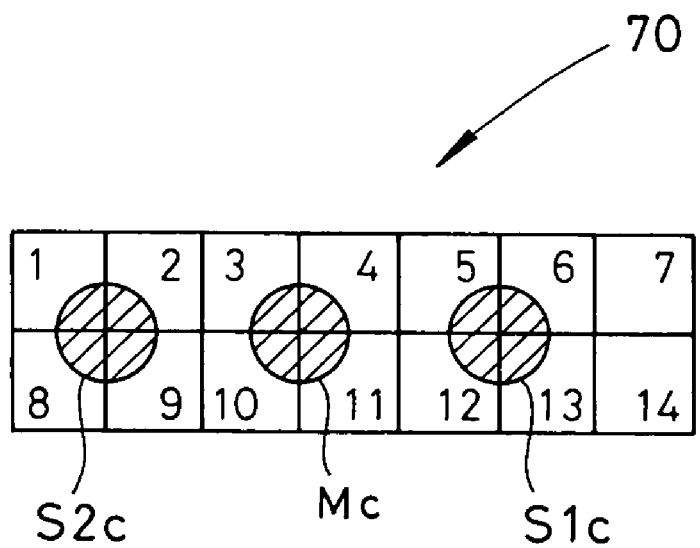
FIG. 21 is a schematic diagram of the photodetector used in the optical pickup apparatus according to the third embodiment of the present invention.

The configuration of a photodetector 70 used in the optical pickup apparatus 100 according to a third embodiment of the present invention will be described with reference to FIGS. 20 and 21. FIG. 20 shows a plan view of the photodetector 70 when it receives three beams of the first laser beam, and FIG. 21 shows a plan view of the photodetector 70 when it receives three beams of the second laser beam.

As illustrated in FIG. 20, the photodetector 70 according to the third embodiment receives a first subbeam S1d on light receiving elements 6, 7, 13, 14 and a second subbeam S2d on light receiving elements 2, 3, 9, 10 when it receives a main beam Md of the first laser beam on light receiving elements 4, 5, 11, 12 comprising a four-division light receiving section. Also, as illustrated in FIG. 21, the photodetector 70 receives a main beam Mc of the second laser beam on light receiving elements 3, 4, 10, 11 comprising a four-division light receiving section; a first subbeam S1c on light receiving elements 5, 6, 12, 13; and a second subbeam S2c on light receiving elements 1, 2, 8, 9.

In other words, two divisional regions (light receiving elements 4, 11) of the four-division light receiving section (light receiving elements 4, 5, 11, 12) for receiving the first laser beam serve as two divisional regions (light receiving elements 4, 11) of the four-division light receiving section (light receiving elements 3, 4, 10, 11) for receiving the second laser beam, and the remaining two divisional regions (light receiving elements 3, 10 and light receiving elements 5, 12) other than the two divisional regions are used also as the subbeam receiving sections for receiving the subbeams. The photodetector 70, configured in this way, can be reduced in size, leading to a reduction in size of the optical pickup apparatus 100.

The photodetector 70 according to the third embodiment needs a logical operation configuration different from the processing unit 80 used in the first and second embodiments, however, explanation thereof is omitted since the operation is similar, and only the result of the operation will be explained below. As illustrated in FIG. 20, the main beam Md of the first laser beam forms a beam spot on the light receiving elements 4, 5, 11, 12; the first subbeam S1d forms a beam spot on the light receiving elements 6, 7, 13, 14; and the second subbeam S2d forms a beam spot on the light receiving elements 2, 3, 9, 10, so that an RF signal by the main beam Md is calculated as d4+d5+d11+d12; a focus error FE signal is calculated as (d4+d12)−(d5+d11); and a tracking error (TE) signal by the two subbeams S1d, S2d is calculated as (d6+d14+d7+d13)−(d2+d3+d9+d10).

Also, as illustrated in FIG. 21, the main beam Mc of the second laser beam forms a beam spot on the light receiving elements 3, 4, 10, 11; the first subbeam S1c forms a beam spot on the light receiving elements 5, 6, 12, 13; and the second subbeam S2c forms a beam spot on the light receiving elements 1, 2, 8, 9, so that an RF sinal by the main beam Md is calculated as d3+d4+d10+d11. A focus error (FE) signal is calculated as (d3+d11)−(d4+d10), and a tracking error (TE) signal by the two subbeams S1d, S2d is calculated as (d5+d6+d12+d13)−(d1+d2+d8+d9).

Figure 22:
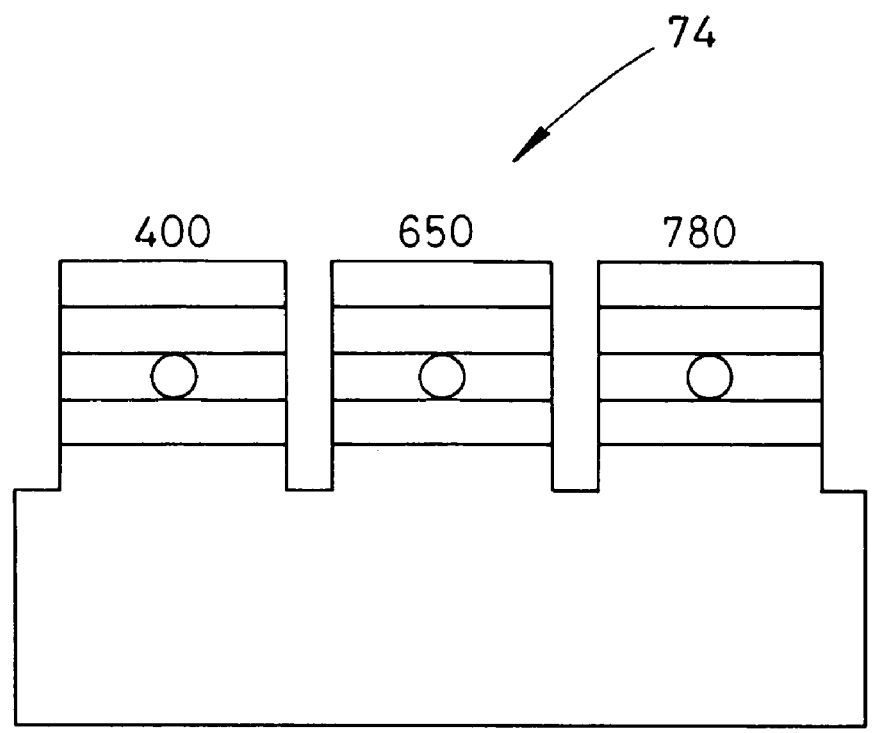
FIG. 22 is a schematic diagram of a semiconductor laser used in an optical pickup apparatus according to a fourth embodiment of the present invention.

The configuration of a semiconductor laser 74 and a photodetector 75 associated therewith, used in the optical pickup apparatus 100, according to a fourth embodiment of the present invention will be described with reference to FIGS. 22 and 23. FIG. 22 is a cross-sectional view of the one-chip laser diode 74 for emitting three laser beams at different wavelengths, and FIG. 23 is a plan view of the photodetector 75 when it is irradiated with three beams of the first laser beam.

FIG. 22 shows the one-chip laser diode 74 for emitting a third laser beam, for example, in a 400-nm band for a next-generation DVD disc, in addition to the first laser beam at 780 nm for the CD and the second laser beam at 650 nm for the DVD. Three light sources are formed at predetermined intervals to selectively drive the three laser beams. The laser diode 74 is disposed such that the 650-nm second laser beam emitting portion positioned in the middle is coincident with the optical axis of the objective lens.

Also, the photodetector 75 used in the optical pickup apparatus 100 according to the fourth embodiment of the present invention is configured to receive main beams and subbeams of the first, second and third laser beams on 16-divided light receiving elements.

Figure 23:
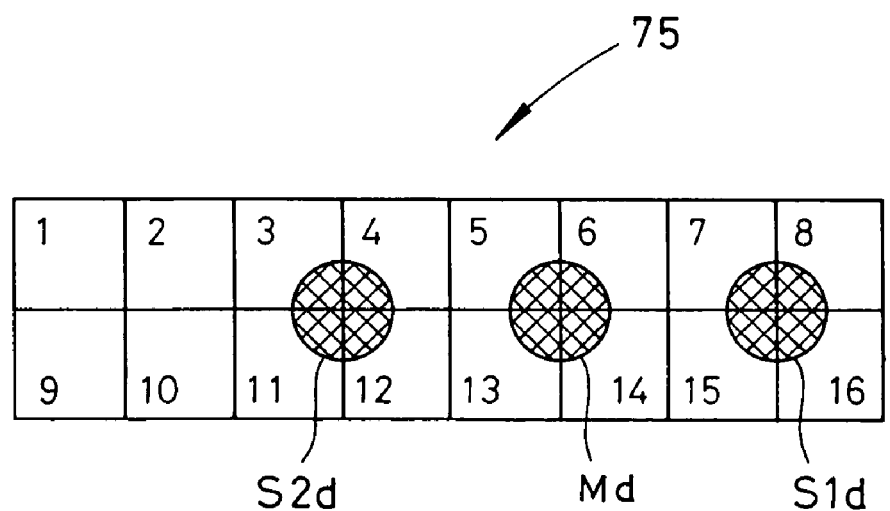
FIG. 23 is a schematic diagram of a photodetector used in the optical pickup apparatus according to the fourth embodiment of the present invention.

FIG. 23 shows main beam and subbeam spots of the first laser beam on the photodetector 75. The main beam (Mc) spot is formed on light receiving elements 5, 6, 13, 14; the beam spot of the first subbeam (S1d) is formed on light receiving elements 7, 8, 15, 16; and the second subbeam (S2d) spot is formed on the light receiving elements 3, 4, 11, 12. On the other hand, when the second laser beam is selectively driven, the main beam (Md) spot is formed on the light receiving elements 4, 5, 12, 13; the first subbeam (S1d) spot is formed on the light receiving elements 6, 7, 14, 15; and the second subbeam (S2d) spot is formed on the light receiving elements 2, 3, 10, 11, skipping two divisional regions (light receiving elements 6, 14).

Further, when the third laser beam is selectively driven, beam spots of the main beam and the pair of subbeams are formed, skipping two divisional regions (light receiving elements 5, 13) in a manner similar to the foregoing. By thus configuring the photodetector 75, three laser beams at different wavelengths can be detected. Also, the photodetector 75 can be configured for a plurality of laser beams of different wavelengths in a similar manner, thereby making it possible to improve the versatility of the photodetector.

While the optical pickup apparatus 100 according to the foregoing embodiments of the present invention is based on an infinite optical system using the collimator lens 53 to transform diverting light to parallel light, the present invention is not limited to the infinite optical system but may be based on a finite optical system, in which case similar effects can be obtained as well.

Also, while the semiconductor laser device is implemented by a one-chip laser diode, the present invention is not limited to the one-chip laser diode but may employ a semiconductor laser device which collectively comprises a plurality of laser beam sources, each of which emits one laser beam, in a hybrid form.

Also, the objective lens is not limited to the implementation of the bifocal lens in the foregoing embodiments, but may employ a bifocal lens formed with a plurality of divisional surfaces by notching the lens, as described, for example, in Laid-open Japanese Patent Application Kokai No. H10-199021. Further alternatively, two objective lenses may be provided for reproducing the DVD and for reproducing the CD, such that these objective lenses are switched for use with the associated optical disc.

The tracking servo is not either limited to the method employed in the foregoing embodiments, and a variety of known methods may be used instead. In addition, the same adjusting method need not be used for reproducing the DVD and for reproducing the CD. Alternatively, a combination of different methods may be employed. For example, the tracking servo adjustment may be made in accordance with the three-beam method for reproducing the CD and in accordance with the phase difference method for reproducing the DVD.

According to the present invention, in an optical pickup apparatus using a multi-wavelength one-chip laser diode, a plurality of laser beams of different wavelengths can be directed along a single light path, thereby making it possible to eliminate the combining prism as well as to reduce the cost and save the space. In addition, the focus servo adjustment can be satisfactorily performed in accordance with the astigmatism method.

The invention has been described with reference to the preferred embodiments thereof. It should be understood by those skilled in the art that a variety of alterations and modifications may be made from the embodiments described above. It is therefore contemplated that the appended claims encompass all such alternations and modifications.

What is claimed is:

1. An optical pickup apparatus for reading information from a plurality of types of discs at different reading wavelengths, comprising:
   a light source having integrated light emitting portions for emitting first and second laser beams of different wavelengths, said light source being adapted to selectively emit one of the first and second laser beams of different wavelengths;
   an optical system that generates a main beam and two subbeams from a selected laser beam of the first and second laser beams and directs the main beam and the subbeams towards an object disc;
   a first four-division photodetector;
   a second four-division photodetector, wherein the first and second four-division photodetectors are arranged such that central division lines of said first and second four-division photodetectors are in alignment with one another and coincident with a tangential direction of a track of the object disc; and a first sub-photodetector disposed on one side of the first and second four-division photodetectors in a direction along which the central division lines extend; and a second sub-photodetector disposed on another side of the first and second four-division photodetectors in the direction along which the central division lines extend, wherein the optical system directs a main beam reflected from the object disc to a corresponding one of the first and second four-division photodetectors and directs the subbeams reflected from the object disc to the first and second sub-photodetectors.

2. An optical pickup apparatus according to claim 1, wherein said optical system includes an astigmatism element for providing the laser beam with astigmatism.

3. An optical pickup apparatus according to claim 1, wherein said first laser beam has a shorter wavelength than that of said second laser beam, and wherein a distance between the light emitting portion for emitting the first laser beam and an optical axis of the optical system is smaller than a distance between the light emitting portion for emitting the second laser beam and the optical axis.

4. An optical pickup apparatus according to claim 1, wherein said first laser beam has a shorter wavelength than that of said second laser beam, and wherein the light emitting portion for emitting the first laser beam is positioned on an optical axis of said optical system.

5. An optical pickup apparatus according to claim 1, wherein said light source is a one-chip laser diode which is formed with one electrode as a common electrode for said plurality of light emitting portions.

6. An optical pickup apparatus comprising:

a light source that selectively emits one of a first laser beam and a second laser beam as a selected beam, wherein the first laser beam has a different wavelength than the second laser beam;

an optical system that directs a first main beam, which corresponds to the selected beam, to a first four-division photodetector and that directs a first sub-beam, which corresponds to the selected beam to a first sub-photodetector;

wherein a first straight line passing through a first optical axis of the first laser beam and through a second optical axis of the second laser beam is parallel to a tangential line of a track of a disc to be reproduced by the optical pickup apparatus;

a second four-division photodetector; and
a second sub-photodetector, wherein the optical system directs a second main beam, which corresponds to the selected beam, to the second four-division photodetector and that directs a second sub-beam, which corresponds to the selected beam to the second sub-photodetector, wherein a second straight line passes through the first four-division photodetector, the second four-division photodetector, the first sub-photodetector, and the second sub-photodetector.

7. The optical pickup apparatus as claimed in claim 6, wherein the second straight line passes through central division lines of the first four-division photodetector and the second four-division photodetector.

8. The optical pickup apparatus as claimed in claim 6, wherein the second straight line is parallel to a tangential line of a track on the disc.

9. An optical pickup apparatus comprising:

a light source that selectively emits one of a first laser beam and a second laser beam as a selected beam, wherein the first laser beam has a different wavelength than the second laser beam; and an optical system that directs a first main beam, which corresponds to the selected beam, to a first four-division photodetector, that directs a first sub-beam, which corresponds to the selected beam to a first sub-photodetector, that directs a second main beam, which corresponds to the selected beam, to a second four-division photodetector, that directs a second sub-beam, which corresponds to the selected beam to a second sub-photodetector;

wherein a straight line passing through the first four-division photodetector, the first sub-photodetector, the second four-division photodetector, and the second sub-photodetector is parallel to a tangential line of a track on a disc to be reproduced by the optical pickup apparatus;

wherein the first four-division photodetector, the first sub-photodetector, the second four-division photodetector, and the second sub-photodetector are aligned in an order the first sub-photodetector, the first four-division photodetector, the second four-division photodetector, and the second sub-photodetector.

10. The optical pickup apparatus as claimed in claim 9, wherein the straight line passes through central division lines of the first four-division photodetector and the second four-division photodetector.

* * * * *